(No Model.)
G. C. BLAKELY & J. B. GILPATRICK.
TENSION DEVICE FOR GRAIN BINDERS.
No. 335,677. Patented Feb. 9, 1886.
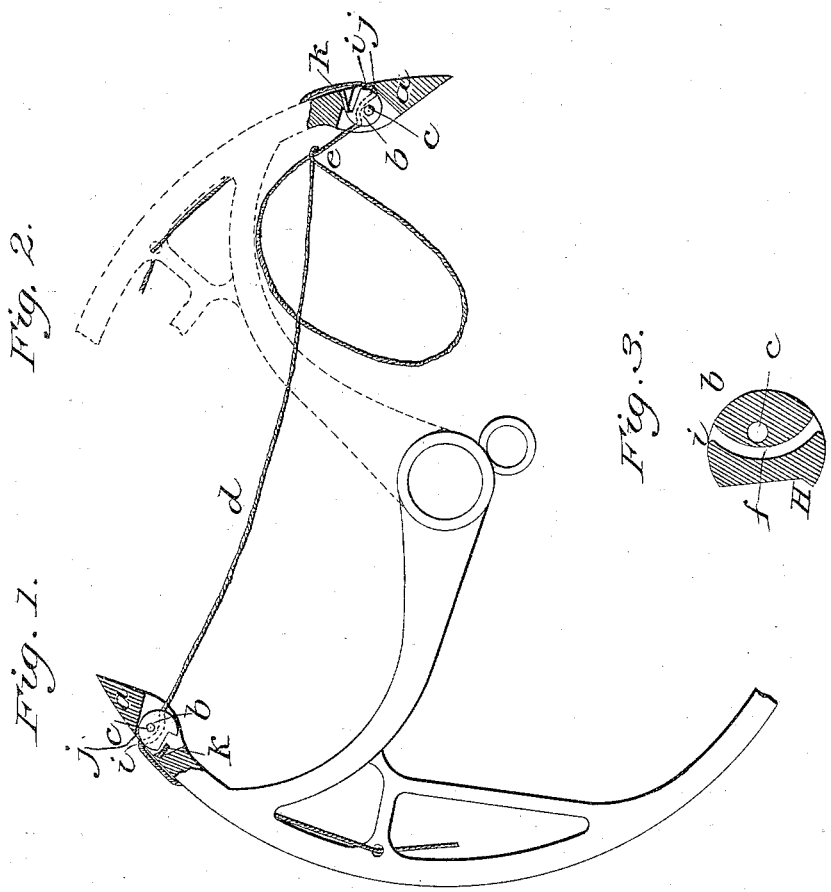
Witnesses:
D. R. Pomeroy
A. L. Hommedieu
Inventors
George Campbell Blakely
John Brisbane Gilpatrick

UNITED STATES PATENT OFFICE.

GEORGE CAMPBELL BLAKELY AND JOHN BRISBANE GILPATRICK, OF PLANO, ILLINOIS.

TENSION DEVICE FOR GRAIN-BINDERS.

SPECIFICATION forming part of Letters Patent No. 335,677, dated February 9, 1886.

Application filed February 9, 1885. Serial No. 155,457. (No model.)

*To all whom it may concern:*

Be it known that we, GEO. C. BLAKELY and JOHN B. GILPATRICK, both of Plano, Kendall county, Illinois, have invented a new and useful Improvement in Automatic Tensions for Twine-Binding Harvesters, of which the following is a specification.

Our invention consists in providing the binder-arm, near its point, with an eccentric, through which the binding-twine passes, constructed and arranged in such a manner that tension is applied to the twine as the latter is carried around the bundle, and also in a setscrew, whereby the tension upon the cord may be regulated at will, all as hereinafter described, and particularly pointed out in the claims.

In the accompanying drawings, Figure 1 is a side elevation, partly in section, of the binderarm, showing the same, the twine, and the tension device in the position for receiving the grain. Fig. 2 is a similar view, showing the parts in the position they assume when the twine has been carried around the bundle; and Fig. 3 is a sectional side elevation of the eccentric, showing the aperture through which the twine passes.

A slot is formed through the binder-arm, near its point $a$, to receive the eccentric $b$, which is held in place by the pivot-pin $c$. The eccentric is provided with the aperture $f$, passing through it from edge to edge and near the pivot $c$, through which aperture the binding-twine $d$ passes. The end of the cord being held by the ordinary cord-holder at $e$, when the binder-arm carries the twine around the bundle into the position shown in Fig. 2, the direction of the draft on the twine is such that the eccentric is rocked on its pivot $c$, and the twine is compressed between the point $i$ on the eccentric (at the end of the aperture $f$) and the point $j$ at one side of slot in the binder-arm, as shown. When the binder-arm is returned to the position shown in Fig. 1, the direction of the stress on twine is changed so that the eccentric is rocked back and the pressure on the twine is removed, thus permitting the twine to render freely through the eccentric and the point of the binder-arm.

$k$ is a set-screw seated in the binder-arm. The shoulder H on the eccentric will come in contact with this set-screw when the eccentric is turned as shown in Fig. 2. By turning this screw in or out the amount of tension on the twine may be regulated at will.

Having thus described our invention, what we claim as new, and desire to secure by Letters Patent, is—

1. In combination with a binder-arm and cord-holder, an eccentric pivoted in said arm near its point and provided with an aperture through which the binding-twine passes, whereby tension is automatically applied to the twine during the process of binding a bundle, substantially as described.

2. In combination with the binder-arm and eccentric, as described, the set-screw $k$, whereby the tension on the twine may be regulated, substantially as set forth.

GEORGE CAMPBELL BLAKELY.
JOHN BRISBANE GILPATRICK.

Witnesses:
D. R. POMEROY,
A. L'HOMMEDIEU.